United States Patent Office 3,248,241
Patented Apr. 26, 1966

3,248,241
PREPARATION OF HIGHLY IMPERVIOUS
REFRACTORIES
Mustafa El Rifai, Wilmington, Del., assignor to E. I. du
Pont de Nemours and Company, Wilmington, Del., a
corporation of Delaware
No Drawing. Filed July 11, 1963, Ser. No. 294,241
5 Claims. (Cl. 106—62)

This invention is concerned with the preparation of refractory bodies by the in situ oxidation of aluminum metals.

The firing of aggregates of aluminum particles to alumina-containing refractory structures is taught in Belgian Patent 612,535, granted July 11, 1962. Such products have excellent properties in general. However, some uses require substantially higher levels of one or more properties.

One object of this invention is to provide for dense, ceramic bodies or metal-ceramic composites that show greater strength, higher impermeability to fluids, and higher thermal conductivity than products of the prior art.

Another object is to provide a process for the preparation of such improved bodies.

In accordance with the process of the aforementioned Belgian patent, a shaped mixture of aluminum particles, a fluxing agent and filler refractory particles is heated to cause in situ oxidation of the aluminum. The unexpected improvements achieved over such process result from the use of certain specified types of aluminum particles in designated proportions plus the shaping of the mixture to give a critical porosity of between (0.27×percent of aluminum+17) percent and (0.38×percent of aluminum+27.5) percent after removal of volatile materials (heating at 500° C. until equilibrium is reached) but before firing.

The novel product of this invention is a refractory body having a total porosity of between about 15 and 35%, preferably 22–35. It is constituted by a skeletal structure of interconnected walls which define substantially isolated cells having an average diameter of about 0.003–.167 inch, said walls consisting essentially of crystalline refractory material selected from the group consisting of alpha alumina, compounds of alumina and at least one other metal oxide, and solid solutions of at least one metal oxide in alpha alumina or alumina compounds and mixtures thereof. The cell walls have a thickness of between 0.001 inch and the diameter of the enclosed cell, and have a density function (as defined below) of at least 0.5. They contain at least 30% $Al_2O_3$ by analysis.

The products of this invention are further characterized by an air permeability of less than $50 \times 10^{-10}$ cm.$^2$, and flexural strengths at 25° C. and 1550° C. of at least 500 pounds per square inch (p.s.i.).

Aluminum particles or alloys containing major amounts of aluminum are used in the amount of between 11 and 35% of the unfired structure. All three dimensions of the average suitable particle as measured through the center of the particle are between 0.005 inch and 0.250 inch, preferably between 0.010 and 0.19 inch. The greatest dimension should be no more than 10 times the least dimension. Suitable particles are further characterized by a bulk density greater than 0.6 gram/cm.$^3$ as determined by pouring the particles into a 1″ diameter cylinder, measuring the height of the column and the weight of the particles. Preferably the particles are compact in shape as spheres, spheroids, ellipsoids, short rods, short bars, etc. Some useful shapes are listed below.

| Aluminum Form | Mesh | Dimensions | Bulk Density, grams/cm.$^3$ |
|---|---|---|---|
| Grained ingot | 5/60 | | 1.59 |
| Do | 20/60 | | 1.68 |
| Do | 60/80 | | 1.40 |
| Deoxidizing shot | 8/28 | | 1.62 |
| Needles | | .025 × .025 × .186.0″ | 1.12 |

Preferably the aluminum particles have a bulk density greater than 1.0 gram/cm.$^3$.

The porosity of the unfired refractory body should be adjusted to give values between the limits (0.27×percent of aluminum+17) percent and (0.38×percent of aluminum+27.5) percent after removal of volatiles. The porosity is calculated from the total volume of the body as determined from its dimensions and the sum of the actual volumes of each solid constituent as calculated from its true density and weight in the body.

$$\text{Percent porosity} = \frac{\text{total volume} - \text{volume of solids}}{\text{total volume}} \times 100$$

The porosity is most readily controlled by changing the molding pressure and/or the particle size distribution of the mixture. If high porosities are desired it may be useful to add fugitive particles that will afford porosity by volatilizing or subliming (e.g., naphthalene) or by combustion (wood powder, plastic beads, carbon, etc.).

Combined with the aluminum particles are certain filler refractory particles. At least 25% of the filler refractory is magnesia, with the remainder being chromia, alumina or both. Particles of these oxides should pass a 4-mesh sieve. From about 65–89% by weight of filler refractory will be present in the green body (exclusive of volatiles). Precursors and mixtures and compounds containing the aforementioned refractory compounds can also be used.

Mixtures of various filler refractories are advantageously used to obtain the desired fired composition. Thus, magnesia and chromia may be used to produce bricks with the composition $Al_2O_3$ 19 to 35%, MgO 53 to 78%, and $Cr_2O_3$ 3–12% by analysis from a mix of 11–22% of aluminum, 64–86% magnesia, and 3–14% of chromia.

Preferably a substantial portion of the filler refractory is capable of reacting or combining with alumina to form compounds such as spinel (from MgO) or solid solutions of the oxide (such as $Cr_2O_3$) in alumina for example.

The mixture of aluminum and filler refractory should contain at least 0.02% of a fluxing agent based on the weight of the aluminum.

Suitable fluxing agents for use in this process include an oxide or hydroxide of a metal from the class consisting of the alkali metals, and the oxides of the alkaline earth metals, vanadium, chromium, molybdenum, tungsten, copper, silver, zinc, antimony, and bismuth, and precursors of these oxides and hydroxides. The oxides and hydroxides of the alkali metals, and the oxides of magnesium, strontium and barium are preferred.

Among suitable precursors of these materials may be mentioned the organic salts such as acetates, benzoates, etc., and inorganic salts as bisulfates, bisulfites, bromates, nitrates, silicates, sulfates, sulfites, thiosulfates, etc., of the recited metals. While not "per se" within the class of useful fluxing agents, these compounds do, under conditions of the reaction, yield compounds within the above defined class.

The fluxing agent is calculated on the basis of the metal oxide that it forms in those cases where a metal oxide precursor is used. The metal oxide or hydroxide can vary in amount from 0.02 to 20% or more based on the total weight of the aluminum. Preferably from about 0.2 to 5% is used. Higher concentrations of fluxing agent may be employed but are generally avoided, unless the fluxing agent also acts as a filler refractory, to prevent undue lowering of the melting point of the final structure and loss of strength at elevated temperatures.

Prior to heating the shaped metal aggregate particles in an oxidizing atmosphere, the surfaces of the aggregate particles are intimately contact with a fluxing agent. The agent may be applied dry, in solution, as a gas or as a melt. The manipulative technique of contacting the metal surface with it is not critical. Thus it may be powdered or sprayed upon the metal, or the metal may be dipped in a solution of the agent or its melt or powder. It is conveniently done using a concentrated aqueous solution or slurry. The use of pressure and/or vacuum to assist in uniform and complete distribution of the agent over the particle surfaces is often advantageous. Furthermore, when using dilute solutions, the addition of a thickener such as sodium carboxy methyl cellulose may be advantageous. The fluxing agent may be mixed with the filler refractory and the metal shapes added to the mixture. The filler refractory may also serve as a flux (e.g., MgO) and vice versa. In some instances as with certain minerals, the filler refractory may also contain the fluxing agent.

In some cases it is advantageous to add minor amounts of water, ethyl alcohol, ethylene glycol, acetone, solutions of carboxy methyl cellulose, rubber, gum arabic, polyvinyl alcohol, natural gums, glue and the like to increase the green strength of the shaped object. A self-bonding additive such as Sorel cement can also be used for this purpose. Preferably a material is used that will burn out under the firing conditions. From about 0.1% to about 2% binder is usually adequate.

The dried "green" molded object is then heated in an oxidizing atmosphere such as air, oxygen or mixtures of oxygen and inert gases at a temperature of at least about 600° C. but below the ignition temperature of the metal at the concentration of oxygen employed. The exact conditions for firing will depend upon the green porosity of the shaped object, the amount of metal, the amount and kind of fluxing agent and the temperature. These interactions and variations among them will be apparent to one skilled in the art. To make the best products, the above-mentioned variables should preferably be selected so that a spontaneous and rapid ignition does not take place, or a spontaneous and rapid reduction of the nonaluminum constituents does not occur. Preferably the rate of heating should be controlled so that the temperature of the molded object does not exceed the ambient temperature by more than 100° C. (and more preferably 50° C.) It is preferred to heat at a relatively low temperature initially, until a stress bearing oxide film develops which holds the molded shape of the aggregate during subsequent further oxidation at a higher temperature.

The above process yields a refractory body with a dense continuous integral skeleton containing alumina. The interconnected walls or elements that constitute the skeleton define or enclose cells or pores. The average size of the cells or pores is determined by the size of the metal particles used in the process. These particles are partially or completely converted to the oxide in the form of a shell or wall surrounding the void left by the original metal particle. The wall or shell defines a cell which corresponds in shape and size to the original metal particle. The cells may be empty or contain some unoxidized aluminum. These pores are to be distinguished from pores existing in the refractory body but outside of the skeletal structure which arise from removal of volatiles or which existed in the green body.

The pores within the skeleton (exclusive of micropores, below 0.5 mil) when measured in a plane cut through a body have an average diameter of between about 3 and 167 mils. Preferably, the pore size will range between about 6.7 and 127 mils. These pores have the appearance of closed cells. The walls surrounding the pores of the skeleton have a minimum thickness of about 1 mil and are substantially homogeneous for at least this width. By "substantially homogeneous" is meant that the wall is substantially free of occlusions of nonskeletal material or voids greater than about 0.1 mil in diameter for the minimum thickness. In general, the aluminum particles which are oxidized in situ are located a sufficient distance apart to permit wall formation of at least the minimum thickness between the voids formed from the metal. However, where two or more metal particles in the green mix are so close that a 1.0 mil wall cannot form between the voids, the wall referred to above is that surrounding the combination of voids.

The maximum thickness of the wall surrounding a pore within the skeleton will be about the diameter of the enclosed pore. However, the walls of two adjacent pores may integrate to give a double wall thickness between them. The walls may appear thicker in a particular planar section, however, since the structure is three-dimensional, the thickness of a wall can best be determined from a section cut perpendicular to the major axis of the cell.

The crystalline grains in the skeletal wall have a density function of from between about 0.5 and 1.0. Structures of this type are exemplified in the examples.

The continuity of the skeletal structure can be shown by treating the refractory with a chemical that is relatively inert to the skeletal phase but which will dissolve or destroy any other phases. An integral structure of substantially all the skeletal material remains. A more simple procedure is to observe the skeletal and other material in enlarged photographs of cuts through the body.

The chemical constitution of the skeleton can be determined by conventional analysis or quantitative X-ray diffraction methods.

A measure of the density of the skeletal structure is the "density function."

Average $$\left[ \frac{\text{Part of perimeter in contact with other grains}}{\text{Total perimeter of grain under consideration}} \right]$$

The density function is determined for each grain by examining a photomicrograph of a polished section of the sample and the results are averaged. Most products of this invention, as made, show no visible grain boundaries after etching and viewing at 750× magnification. In this event the value of the density function approaches an upper limit of 1.0. Grain growth can occur with prolonged heating at, for example, 100 hours at 1600° C. to afford an average grain size of about 8 microns. Further grain growth is limited by the thickness of the skeleton and the value of the density function approaches the lower limit of 0.5.

Cell (or pore) size is determined by the lineal analysis of microstructure technique as discussed by W. D. Kingery in "Introduction to Ceramics," pages 412–417 (published by John Wiley and Sons, Inc., New York, 1960).

IRON OXIDE PENETRATION TEST

The small face of a brick size sample is drilled to form a ¾ inch diameter hole 2¾ inch deep. The hole is filled with 100 grams of finely powdered FeO and the brick then heated to 1650° C. and held for 5 hours while the atmosphere is cycled between oxidizing and reducing every 20 minutes. The cold brick is cut in half through the axis of the hole and the penetration (below the bottom of the hole) of FeO in inches is measured on the cut face.

The reheat stability is determined on a fired sample by heating it in a gas-fired furnace (oxidizing atmosphere) from room temperature to 1650° C. at a rate of 135° C./hour, holding at 1650° C. for 5 hours and permitting the furnace to cool before removing the sample.

AIR PERMEABILITY TEST

A sample is cut to 2.0 x 2.8 x 2.8 cm. (±0.2 cm.). Four sides are coated with beeswax. One side is open for the entrance of air and a funnel is attached to an aluminum gasket which is then sealed to the opposite side with beeswax. Air is pulled through the sample and a flowmeter to a vacuum pump.

$$\text{Permeability in cm.}^2 = \frac{B \times C \times E}{A \times D \times 60}$$

$A$ = length of sample × width of sample in cm.
$B$ = height of sample in cm.
$C$ = flow of air in ml./minute
$D$ = $\Delta P$ of vacuum in dynes/cm.$^2$
$E$ = viscosity of air (0.000183 poise)

The hot load subsidence test is run on a full size brick according to ASTM–C–210. The percent hot load subsidence is the percent of the original height that subsides (or compacts) under a stated loading and temperature.

Thermal shock resistance is determined by a test similar to ASTM C122–5. A ½ brick size sample (4.5" x 4.5" x 2.5" or 3") is placed in a brick panel and the face of the brick heated to 1370° C. by a gas flame for 10 minutes and then cooled by forced air for 10 minutes. This cycle is repeated 12 times. The percent of the original weight that is lost by spalling is reported as "Thermal Spalling." If much weight is not lost, the type and extent of cracking is reported.

All sieve measurements are made with U.S. Sieve Series.

Flexural strength is measured according to ASTM Standard 1958, Part 4, page 670, Text No. C293–57T with the use of a span width of 1 to 8 inches.

EXAMPLE I

Full size bricks are molded from a mixture of 18.5 parts aluminum particles, 76 parts magnesia, 5.5 parts chromia and 5 parts of a 35% aqueous solution of gum arabic. The bricks are pressed (3000 p.s.i.) so that they have a green (unfired) density of 2.38 gram/cm.$^3$ after thoroughly drying at 100° C. The bricks are fired in an air atmosphere according to the following schedule: 25° to 800° in 8 hours, 4 hours at 800°, 10 hours at 900°, 8 hours each at 1100°, 1200°, and 1300°, 12 hours at 1400° and 36 hours at 1500° C.

The aluminum used is a mixture of grain ingot, 20/60 mesh (99.6% Al) 60% and deoxidizing shot, 8/28 mesh (99.5% Al) 40%.

The magnesia is a dead-burnt magnesite (97.5% MgO) of 60% 48/200 mesh and 40% −200-mesh particles.

The chromia is a commercial chrome green (98% $Cr_2O_3$) of −200-mesh size.

The dried (but unfired) brick (apparent or bulk density 2.38 grams/cm.$^3$) has a total porosity of 31.5% calculated using densities of 2.70, 3.65 and 5.21 g./cm.$^3$ for the aluminum, magnesia and chromia respectively. The maximum permissible porosity for 18.5% aluminum is [.38(18.5)+27.5] or 34.5% for the process of this invention.

The bricks expand 10% in volume during firing and 86% of the aluminum is oxidized. The bricks have the following properties:

| | |
|---|---|
| Flexural strength at 25° C. | 1050 p.s.i. |
| Flexural strength at 1550° C. | 1000 p.s.i. |
| Spalling loss | 0%. |
| Air permeability | 10×10$^{-10}$ cm.$^2$. |
| Iron oxide penetration | 0.2 inch. |
| Hot load subsidence 25 p.s.i. load at 1720° C. | 0.3%. |
| Reheat stability (to 1650° C.) | 1.1% expansion, no cracking. |
| Apparent density | 2.46 g./cm.$^3$. |
| Total porosity | 34%. |

Repetition of the above procedure using a lower molding pressure affords a porosity (dried) of 36% (outside the limits of the process) and a permeable fired brick (115×10$^{-10}$ cm.$^2$).

The above procedure is repeated replacing the aluminum spheres with forms of aluminum that are not suitable—

(1) Mill granules 30/100 mesh, 86%+80 mesh, with a bulk density of 0.44 g./cm.$^3$ (2) Flake, 4/20 mesh with a bulk density of 0.51 g./cm.$^3$ Although maximum molding pressure is used (6000 p.s.i.) the dried bricks have excessively high porosities of 45 and 42% respectively. The fired bricks are very permeable (305 and 175×10$^{-10}$ cm.$^2$, respectively) and are weaker than above especially at 1550° C. (40 and 70 p.s.i. respectively).

EXAMPLE II

The procedure of Example I is followed to make bricks of various compositions reported with their properties in Table I.

The following materials are used:

Aluminum:
    Grained ingot 20/60 mesh _____ Items a, c, e, g.
    Grained ingot 20/60 mesh and deoxidizing shot 8/28 mesh in 6:4 ratio _____ Item f.
    Needles _____ Items b and d.

Magnesia—high purity similar to that in Example I:
    Particle size similar to Example I _____ Items a, b, c, and d.
    70% −200 mesh and 30% 48/200 _____ Item e.
    100% −200 mesh _____ Items f and g.

Chromia of Example I:
    Alumina—99.5±% crystalline $Al_2O_3$, 14/28 mesh

All of the unfired samples of the items in Table I have porosities within the limits of this invention and the fired products are all characterized by excellent strength and low permeabilities.

When the aluminum particles used for item b are replaced with aluminum rods 0.010" in the diameter by about 0.190" (0.39 gram/cm.$^3$ bulk density) the fired product has an air permeability of 90×10$^{-10}$ cm.$^2$ even though the dried brick has the same porosity as item b.

The replacement of the grain ingot in item c with aluminum cut foil (0.0008 x 0.125 x 0.125" with a bulk density of 0.45 gram/cm.$^3$) to make a dry brick of similar green porosity to item c affords a fired product with a permeability of 60×10$^{-10}$ cm.$^2$.

When the procedure is repeated but using a higher molding pressure so that the porosity of the dry brick is less than the minimum permitted as indicated above, the bricks generally crack and frequently burst.

The use of too high a porosity results in a permeable structure. A sample prepared as item f but with an unfired porosity of 36.4% (vs. a maximum permissible of 35.7%) has an air permeability of $117 \times 10^{-10}$ cm.$^2$ after firing.

The total porosities of the fired items b, c, d and e are 28, 18, 21 and 26% respectively.

*Table I*

| Item | Dry Body | | | | | Fired Body | | |
|---|---|---|---|---|---|---|---|---|
| | Aluminum percent | MgO, percent | Cr$_2$O$_3$, percent | Al$_2$O$_3$, percent | Porosity percent | Flexural at 25° | Strength at 1,550° | Permeability $10^{-10}$ cm.$^2$ |
| a | 11.6 | 83. | 5.4 | 0 | 28.1 | 610 | 550 | 10 |
| b | 15.0 | 79.3 | 5.7 | 0 | 27.4 | 1,020 | 970 | 5 |
| c | 20.0 | 74.3 | 5.7 | 0 | 26.5 | 550 | | 20 |
| d | 30.2 | 57.1 | 12.7 | 0 | 38.2 | 2,430 | 800 | 7 |
| e | 18.8 | 52. | 11.7 | 17.5 | 29.4 | 1,200 | 1,100 | 0 |
| f | 22.2 | 18.0 | 6.0 | 53.8 | 31.6 | 2,060 | 570 | 32 |
| g | 26.0 | 18.5 | 6.1 | 49.4 | 34.0 | 1,660 | 2,970 | 0 |

EXAMPLE 3

Full size bricks are molded from a mixture of 14.8% aluminum particles, 83.9% magnesia and 1.5% vanadium pentoxide to have a "green" porosity of 28.9% after drying.

The aluminum used is the particulate mixture of Example 1. The magnesia is a periclase with 55% of the particles 40/200 mesh and the remainder passing 200 mesh.

The bricks are fired as in Example 1.

The fired bricks have a permeability of $19.7 \times 10^{-10}$ cm.$^2$, a zero spalling loss (slight cracking), an iron oxide penetration of 0.4 inch, a hot load subsidence (1650° C. at 25 p.s.i.) of zero, a reheat stability of 0.9% expansion, and a total porosity of 31.5%.

What is claimed is:

1. A process for preparing highly impervious refractories comprising mixing (1) from 11–35% by weight of metal particles of the group consisting of aluminum and alloys having a major amount of aluminum, said particles having a bulk density greater than 0.6 gram/cc. and having all three dimensions between 0.005 inch and 0.250 inch, the greatest dimension of said particles being less than ten times that of the least dimension, with (2) at least about 0.02% by weight of a fluxing agent based on the weight of the aluminum and (3) from about 65–89% by weight of filler refractory particles, at least 25% of which are magnesia, said refractory particles being of a size which will pass through a 4-mesh sieve, shaping the mixture under sufficient pressure to give a porosity of between (0.27×percent aluminum+17) percent and (0.38×percent aluminum+27.5) percent after removal of volatile materials and firing the shaped body to oxidize the aluminum at a temperature of at least about 600° C. and at a rate so that the temperature of the molded object does not exceed the ambient temperature by more than 100° C.

2. The process of claim 1 wherein the fluxing agent is selected from the group consisting of oxides and hydroxides of alkali metals, the oxides of the alkaline earth metals, vanadium, chromium, molybdenum, tungsten, copper, silver, zinc, antimony and bismuth, and precursors of these oxides and hydroxides.

3. The process of claim 1 wherein the filler refractory is a mixture of magnesia, chromia and alumina.

4. A process for preparing highly impervious refractories comprising mixing on a weight basis from 11–22% of aluminum, 64–86% of magnesia and 3–14% of chromia, the aluminum being in the form of particles having a bulk density greater than 0.6 gram/cc. and having all three dimensions between 0.005 and 0.250 inch, the greatest dimension of any particle being less than ten times the least dimension, the magnesia and chromia being in the form of particles of a size which will pass a 4-mesh sieve, shaping the mixture under sufficient pressure to give a porosity of between (0.27×percent aluminum+17) percent and (0.38×percent aluminum+27.5) percent and firing the shaped body to oxidize the aluminum at a temperature of at least 600° C. and at such a rate that the temperature of the molded object does not exceed the ambient temperature by more than 100° C.

5. A refractory produced by the process of claim 1.

References Cited by the Examiner

UNITED STATES PATENTS 2,741,822   4/1956   Udy _____ 106—65

TOBIAS E. LEVOW, *Primary Examiner.*